United States Patent
Sugimoto

(10) Patent No.: US 7,429,120 B2
(45) Date of Patent: Sep. 30, 2008

(54) HEADLIGHT SWIVEL CONTROL APPARATUS

(75) Inventor: Toshio Sugimoto, Okazaki (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 11/975,150

(22) Filed: Oct. 17, 2007

(65) Prior Publication Data

US 2008/0101076 A1    May 1, 2008

(30) Foreign Application Priority Data

Oct. 31, 2006    (JP)    ............................ 2006-295283

(51) Int. Cl.
*B60Q 1/00*    (2006.01)

(52) U.S. Cl. .................... 362/466; 362/37; 362/465; 701/49

(58) Field of Classification Search ............... 362/37, 362/43, 464–468, 525, 526, 271, 272; 701/49
See application file for complete search history.

(56) References Cited

U.S. PATENT DOCUMENTS

| | | | | |
|---|---|---|---|---|
| 5,931,572 A | * | 8/1999 | Gotoh | ........................ 362/466 |
| 6,752,508 B2 | * | 6/2004 | Kobayashi | .................... 362/37 |
| 7,344,288 B2 | * | 3/2008 | Kobayashi et al. | .......... 362/466 |
| 7,374,320 B2 | * | 5/2008 | Horii et al. | ................... 362/466 |
| 2005/0253738 A1 | | 11/2005 | Kobayashi et al. | |
| 2006/0028832 A1 | | 2/2006 | Horii et al. | |

FOREIGN PATENT DOCUMENTS

| | | |
|---|---|---|
| JP | 2005-313804 | 11/2005 |
| JP | 2006-069521 | 3/2006 |

* cited by examiner

*Primary Examiner*—Stephen F Husar
(74) *Attorney, Agent, or Firm*—Harness, Dickey & Pierce, PLC

(57) ABSTRACT

The headlight swivel control apparatus includes a first function of obtaining road map data, current position information of a vehicle, and width-direction-position information for determining a position of the vehicle on a road on which the vehicle is driving in a width direction of the road, a second function of determining a control start point on the road on the basis of the road map data and the current position information, a third function of determining, on the basis of the road map data and the current position information, a width-direction distance representing a distance between a centerline of the road and the vehicle, a fourth function of calculating a target swivel angle depending on road curvature data included in the road map data, and a fifth function configured to start, when the vehicle reaches the control start point, to perform a swivel control.

7 Claims, 7 Drawing Sheets

HEADLIGHT SWIVEL CONTROL APPARATUS

CROSS-REFERENCE TO RELATED APPLICATION

This application is related to Japanese Patent Application No. 2006-295283 filed on Oct. 31, 2006, the contents of which are hereby incorporated by reference.

BACKGROUND OF THE INVENTION

1. Field of the Invention

The present invention relates to a swivel control apparatus for controlling a vehicle headlight which is disposed in a front part of a vehicle, and has such a configuration that a light axis thereof is laterally adjustable.

2. Description of Related Art

There is known a headlight having a configuration in which a swivel angle of a light axis (light distribution direction) thereof is adjustable. Such a headlight is controlled by a swivel control apparatus such that the swivel angle is varied depending on a steering angle of a steering wheel of a vehicle or a road curvature ahead of the vehicle obtainable from a road map data. For example, refer to Japanese Patent Application Laid-open No. 2006-69521. Such a control makes it possible that the illuminating direction of the headlight well coincides with the viewing angle of the driver.

However, a road curvature included in a road map data indicates a curvature of a width-direction center of a road (a curvature of a centerline in the case of a centerlined road). Meanwhile, in most cases, a vehicle travels along a line outwardly or inwardly deviated from the width-direction center of the road. Accordingly, the above described conventional swivel control apparatus has a problem in that it often occurs that the viewing angel of the driver and the illuminating direction of the headlight do not accord with each other.

SUMMARY OF THE INVENTION

The present invention provides a headlight swivel control apparatus for laterally controlling a swivel angle of a headlight of a vehicle comprising:

a first function of obtaining road map data, current position information indicating a current position of the vehicle in the road map data, and width-direction-position information for determining a position of the vehicle on a road on which the vehicle is driving in a width direction of the road;

a second function of determining a control start point on the road on the basis of the road map data and the current position information;

a third function of determining, on the basis of the road map data and the current position information, a width-direction distance representing a distance between a centerline of the road and the vehicle;

a fourth function of calculating a first target swivel angle depending on road curvature data included in the road map data, the road curvature data indicating a curvature of the road ahead of the vehicle; and a fifth function configured to start, when the vehicle reaches the control start point, to perform a first swivel control in order to cause the swivel angle of the headlight to approach to the first target swivel single.

According to the present invention, there is provided a headlight swivel control apparatus which can control a swivel angle of a vehicle headlight such that the illuminating direction of the headlight well coincides with the viewing direction of a vehicle driver.

Other advantages and features of the invention will become apparent from the following description including the drawings and claims.

PREFERRED EMBODIMENTS OF THE INVENTION

Figure 1:
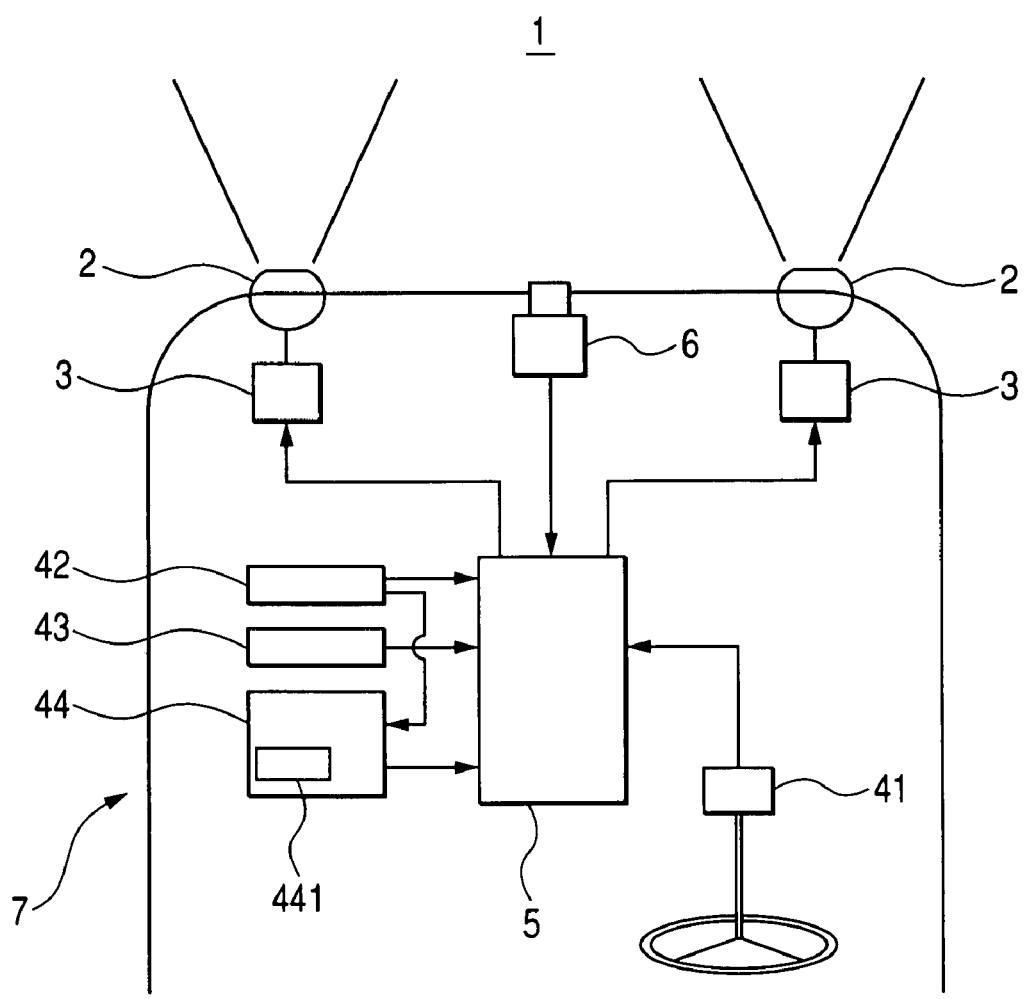
FIG. 1 is a block diagram showing a structure of a vehicle headlight apparatus including a headlight swivel control apparatus according to an embodiment of the invention.

FIG. 1 is a block diagram showing a structure of a vehicle headlight apparatus 1 including a headlight swivel control apparatus (referred to simply as a control apparatus hereinafter) 5 according to an embodiment of the invention.

As shown in FIG. 1, the vehicle headlight apparatus 1 includes a pair of headlights 2 located in a front part of a vehicle 7, two drive mechanisms 3 driving the headlights 2 to rotate in a horizontal plane, a steering angle detection unit 41 detecting a steering angle ω of a steering wheel of the vehicle 7, a position detection unit 42 detecting a current position of the vehicle 7, a speed estimation unit estimating a vehicle speed V of the vehicle 7, a navigation unit 44, the control apparatus 5, and a vehicle-mounted camera 6.

The drive mechanism 3, which is for driving the headlight 2 to rotate around a vertical rotation axis of the headlight 2 within a predetermined angle range, includes a motor electrically connected to the control apparatus 5 controlling the rotation of this motor, a worm gear rotating in one with a rotation shaft of the motor, and a worm wheel in screw engagement with the worm gear. The rotation shaft of the headlight 2 is fixed to the worm wheel so as to rotate in one with the worm wheel. This driving mechanism 3 enables adjusting the swivel angle of the light axis of the headlight 2 within a predetermined angle range (±15 degrees, for example).

The steering angle detection unit 41 is provided with a steering angle sensor to detect the steering angle w.

The position detection unit 42 is provided with a GPS receiver receiving position detecting data (data indicative of position coordinates of a GPS satellite, data indicative of time, etc.) to detect a current position X of the vehicle 7. In addition to the GPS receiver, other position detecting sensors such as an earth magnetism sensor, and a gyro sensor may be provided to detect the current position of the vehicle 7 by complementary use of them.

The speed estimation unit 43 includes a vehicle speed sensor mounted on each wheel of the vehicle 7, which generates a vehicle speed pulse signal indicative of a rotation speed of the wheel, and estimates the vehicle speed on the basis of the vehicle speed pulse signal received from each vehicle speed sensor.

The navigation unit 44 is provided with a memory device 441 storing road map data. This road map data includes node information and link information for each of navigation points located along each road. Each node information includes position coordinates information of a corresponding navigation point. Each link information includes connection information (road curvature R, road vector or road curvature direction) of a corresponding pair of adjacent navigation points. A navigation point located at an end of a curved line is defined as a curved line end point. Here, the term "curved line" means a road portion having a rod curvature R smaller than 200R.

The navigation unit 44 determines which road the vehicle 7 is driving on the basis of the current position X of the vehicle 7 detected by the position detection unit 42 and the road map data stored in the memory device 441, and determines an on-road current position of the vehicle 7 (a current position of the vehicle 7 on a road described by dots and lines in the road map data). When a guide route is set in the navigation unit 44, the navigation unit 44 performs a route guide operation so that the vehicle 7 travels along the guide route.

The camera 6 mounted on the vehicle 7 operates to take a picture of a view ahead of the vehicle 7 one by one in accordance with instruction from the control apparatus 5, or continuously take pictures of the view. Image signals representing the picture taken by the camera 6 are sent to the control apparatus 5.

The control apparatus 5, which is constituted by a microcomputer including a CPU, a ROM, a RAM, etc., operates to control the swivel angle α by executing a program stored in the ROM, while utilizing a temporary storage function of the RAM.

Figure 2:
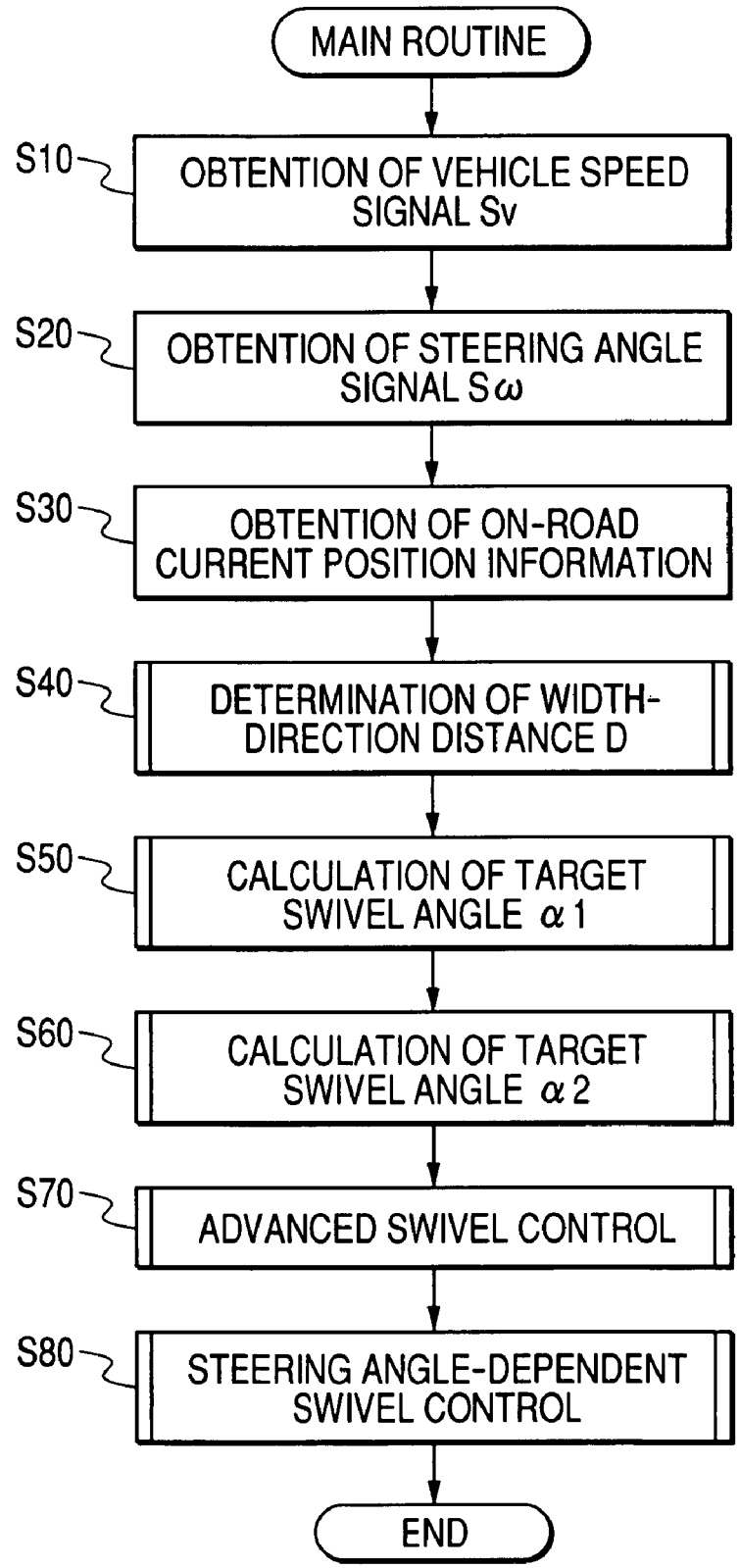
FIG. 2 is a flowchart showing a main routine periodically executed by the control apparatus to control a swivel angle of a headlight of the vehicle.

FIG. 2 is a flowchart showing a main routine periodically executed by the control apparatus 5 to control the swivel angle α. This main routine begins by obtaining, at step S10, a vehicle speed signal Sv indicative of the vehicle speed V from the speed estimation unit 43. At step S20, a steering angle signal Sω indicative of the steering angle ω is obtained from the steering angle detection unit 41. At step S30, the on-road current position information indicative of the current position of the vehicle 7 on a road the vehicle is driving on (may be referred to as a driving road hereinafter) is obtained from the navigation unit 44.

At step S40, there is determined a distance between a width-direction center of the driving road and the vehicle 7 (referred to as a "width-direction distance D" hereinafter) by executing a later-explained subroutine shown in FIG. 3.

At step S50, there is calculated a target swivel angle α1 as a target value of the swivel angle α in a steering angle-dependent swivel control by executing a later-explained subroutine shown in FIG. 4. At step S60, there is calculated a target swivel angle α2 as a target value of the swivel angle α in an advanced swivel control by executing a later-explained subroutine shown in FIG. 5.

At step S70, the control apparatus carries out the advanced swivel control in cooperation with the navigation unit 44 by executing a later-explained subroutine shown in FIG. 6. At step S80, there is carried out the steering angle-dependent swivel control by executing a later-explained subroutine shown in FIG. 7.

Next, explanation is made as to the subroutine shown in. FIG. 3, which is executed for calculating the width-direction distance D. This subroutine begins by obtaining image signals representing a view ahead of the vehicle 7 from the camera 6 at step S41.

At step S42, recognition is made on the presence or absence of a median on the driving road, and the number of lane division lines painted white or yellow on the driving road by analyzing the image signals obtained at step S41. In accordance with the result of the recognition, the number of lanes of the entire road is determined. In this embodiment, the number of lanes of the entire road means a sum of the number of ongoing lanes and the number of oncoming lanes of the road. In a case where it is recognized that the driving road does not have a median or a centerline, it is judged that the number of lanes of the driving road is one, or the driving road is a single-lane road.

At step S43, there is determined a lane in which the vehicle 7 is driving (may be referred to as a driving lane hereinafter) by analyzing the image signals obtained at step S41. More specifically, in a case the road is determined to be a single-lane road at step S42, the single lane of the road is determined to be the driving lane. In a case where the driving road is determined to be a multiple-lane road, recognition is made on an object located at the width-direction center of the driving road defining a center of the road (centerline or median, for example) by which ongoing lanes and oncoming lanes are divided from each other, and on lane division lines by analyzing the image signals. It is determined by use of the result of this recognition that what number lane from the width-direction center of the driving road is the driving lane (the lane the vehicle 7 is driving in) to determine the number n of the lanes from the width-direction center of the road to the driving lane. It is also determined by use of the result of this recognition whether the width-direction center of the driving road is on the right or left side of the driving lane.

At step S44, there is determined the width-direction distance D on the basis of relationship data (to be explained later) stored in the memory device 441, the number of lanes of the driving road, and the number n of the lanes from the width-direction center of the driving road to the driving lane, which are determined at step S42 and step S43.

More specifically, if the driving road is judged to be a single-lane road, the vehicle 7 is judged to be driving along the width-direction center of the single-lane road, and the width-direction distance D is determined to be 0. On the other hand, if the driving road is judged to be a multiple-lane road, the width-direction distance D is determined on the basis of the relationship data stored in the memory device 441, and the driving lane determined at step S43. The relationship data stored in the memory device 441 is data representing a relationship between the number n of the lanes from the width-direction center of the road to the driving lane, and the width-direction distance D. When a width of each lane is d (m), this relationship can be represented by the following equation (1)

$$D = d \times (n-1) + d/2 \tag{1}$$

The value of d may be set at a typical value of 3.5 m.

Figure 4:
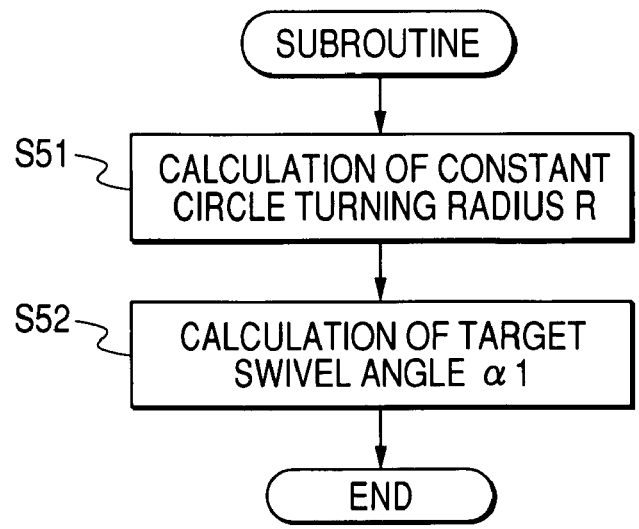
FIG. 4 is a flowchart showing a subroutine included in the main routine, which is executed to calculate a target swivel angle used in a steering angle-dependent swivel control.

Next, explanation is made as to the subroutine shown in FIG. 4, which is executed for calculating the target swivel angle α1. This subroutine begins by calculating, at step S51, a constant circle turning radius R by substituting the vehicle speed V indicated by the vehicle speed signal Sv obtained at step S10 and the steering angle ω indicated by the steering angle signal Sω obtained at step S20 in FIG. 2 into the following equation (2).

$$R=(L/(\omega \times S)) \times (1+KV^2) \qquad (2)$$

In the equation (2), L is a wheelbase, S is a steering gear ratio, and K is a stability facto.

At step S52, the target swivel angle α1 is calculated by substituting the vehicle speed V and the constant circle turning radius R calculated at step S51 into the following equation (3). In the equation (3), T is a light-distribution-point determining time which is set, for example, at 3 seconds.

$$\alpha 1=((T \times V/2)/2\pi R) \times 360 \qquad (3)$$

Figure 8:
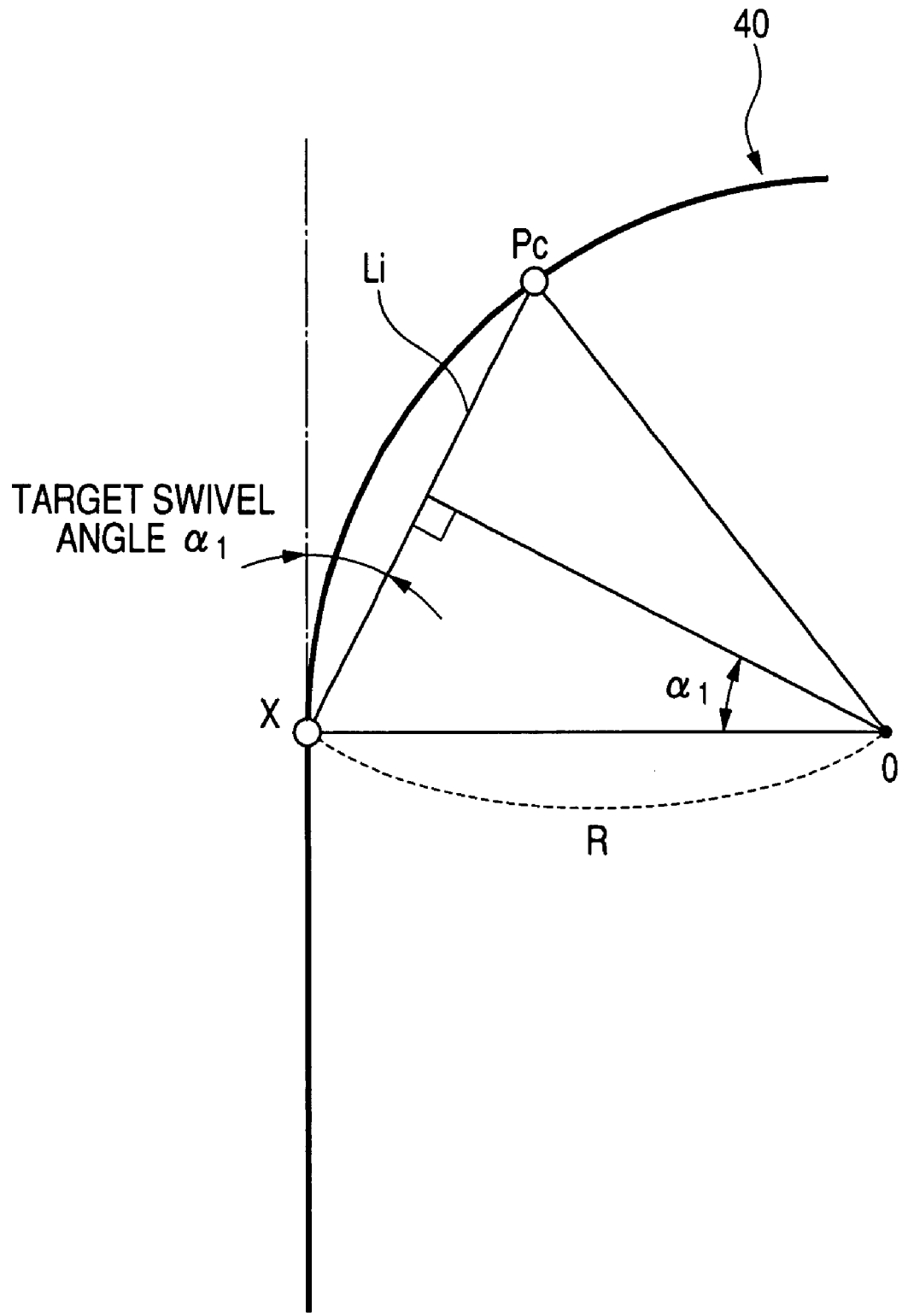
FIG. 8 is a diagram for explaining how the target swivel angel can be calculated.

In the equation (3), T×V represents a distance of length of a circular arc which the vehicle 7 turning along a constant circle of radius R travels during a period of T seconds. Accordingly, as shown in FIG. 8, a center angle of the arc having a length of T×V/2 on the constant circle of radius R becomes the target swivel angle α1.on the basis of said road map data and said current position information In FIG. 8, the reference numeral 40 denotes a line on which the vehicle 7 actually travels. Assuming that the vehicle 7 traveling at the speed of V is at the current position X at a given time, the vehicle 7 come to a light distribution point Pc T seconds after the given time. Accordingly, the target swivel angle α1 is set at such a value that the light axis Li of the headlight 2 passes through the light distribution point Pc.

Figure 5:
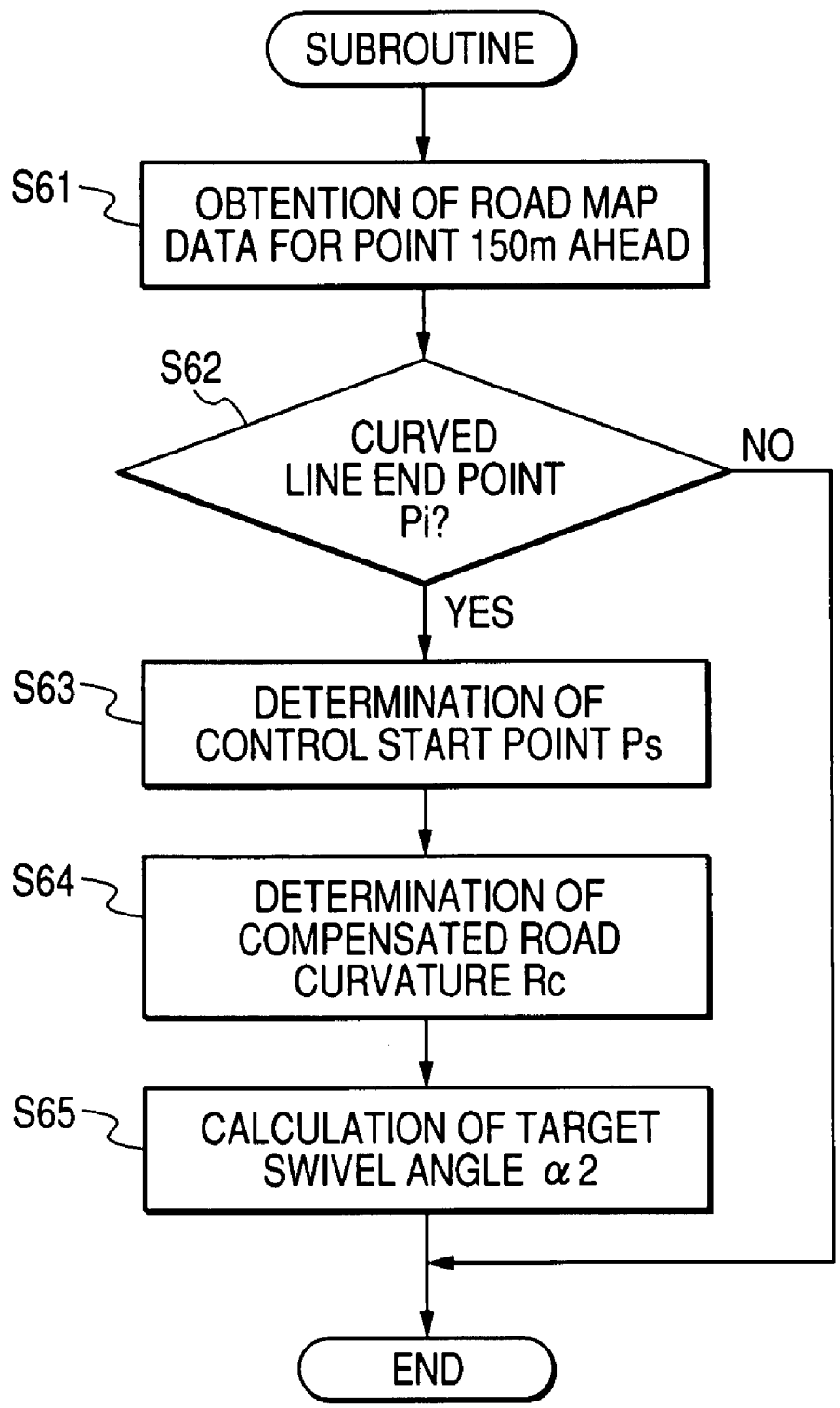
FIG. 5 is a flowchart showing a subroutine included in the main routine, which is executed to calculate a target swivel angle used in an advanced swivel control.

Next, explanation is made as to the subroutine shown in FIG. 5, which is executed for calculating the target swivel angle α2. This subroutine begins by obtaining, at step S61, a part of the road map data covering a point on the driving road predetermined distance (150 m in this embodiment) ahead of the current position X from the memory device 441 of the navigation unit 44.

At step S62, it is judged whether or not the point 150 m ahead is a curved line end point Pi on the basis of the road map data obtained at step S61. If the judgment at step S62 is negative, the subroutine of FIG. 5 is terminated, and the main routine of FIG. 2 proceeds to step S70.

On the other hand, if the judgment at step S62 is affirmative, the subroutine proceeds to step S63 where a control start point Ps is determined on the basis of the curved line end point Pi. This control start point Ps is a point which the vehicle 7 is estimated to reach after a lapse of a predetermined time (three seconds in this embodiment). Accordingly, this control start point Ps is set at a point which is V×3 meters (V being the vehicle speed obtained at step S10 in FIG. 2) before the curved line end point Pi.

Figure 3:
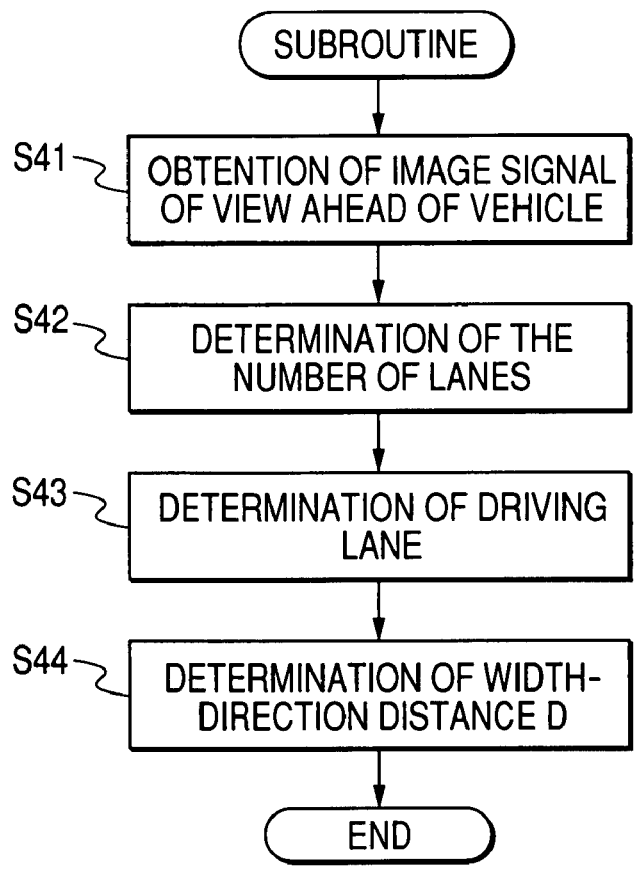
FIG. 3 is a flowchart showing a subroutine included in the main routine, which is executed by calculating a width-direction distance between a road centerline of a road and a vehicle traveling on the road.

As step S64, the road curvature R at the curved line end point Pi is compensated on the basis of the width-direction distance D determined by executing the subroutine shown in FIG. 3 in order to determine a compensated road curvature Rc.

More specifically, if the determined width-direction distance D is 0, the road curvature R of the road portion starting from the curved line end point Pi, which is obtainable from the road map data, is set as the compensated road curvature Rc as it is. And if the determined width-direction distance D is not 0, and the road portion starting from the curved line end point Pi is left curved, the road curvature R obtained from the road map data minus the determined width-direction distance D (=R−D) is set as the compensated road curvature Rc. And if the determined width-direction distance D is not 0, and the road portion starting from the curved line end point Pi is right curved, the road curvature R obtained from the road map data plus the determined width-direction distance D (=R+D) is set as the compensated road curvature Rc.

Figure 9:
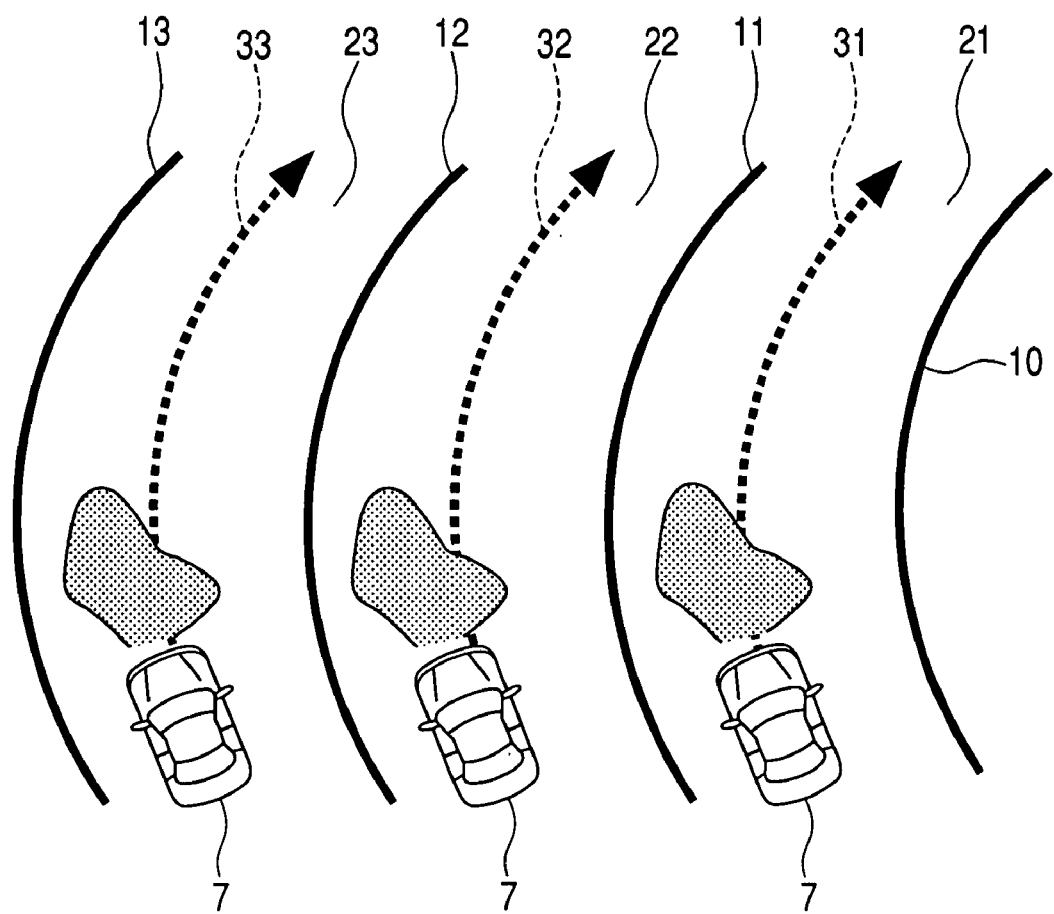
FIG. 9 is a diagram for explaining how a compensated road curvature is calculated in a case where the vehicle is traveling on a 6-lane road.

Here, explanation is given as to the reason why the road curvature R obtained from the road map data is compensated by the width-direction width D with reference to FIG. 9.

FIG. 9 shows one of two 3-lane sections of a curved road portion of a 6-lane road. As shown in this figure, this section is right-curved, and is divided into three lanes of a first lane 21, a second lane 22, and a third lane 23 by a road centerline 10 and three lane division lines 11, 12, 13.

When the vehicle 7 drives on this road portion, it travels along one of a first driving line 31, a second driving line 32, and a third line 33 respectively representing width-direction centers of the first lane 21, second lane 22 and third lane 23. Meanwhile, the road curvature R of this curved road portion indicated by the road map data stored in the memory device 441 is a curvature of the road centerline 10. Accordingly, a curvature R31 of the first driving line 31, a curvature R32 of the second driving line 32, and a curvature R33 of the third driving line 33 are all different from the road curvature R indicated by the road map data. Hence, the road curvature R obtained from the road map data needs to be compensated.

Here, comparison is made between the curvatures R31, R32, R33 of the first to third driving lines 31, 32, 33 and the curvature R10 of the road centerline 10. The curvature R31 of the first driving line 31 is larger than the curvature R10 by half a lane width of d, the curvature R32 of the second driving line 32 is larger than the curvature R10 by 1.5 times the lane width of d, and the curvature R33 of the third driving line 33 is larger than the curvature R10 by 2.5 times the lane width of d. Hence, the road curvature R obtained from the road map data is compensated depending on the width-direction distance D calculated from the equation (1) to obtain the compensated road curvature Rc indicative of a curvature of an actual driving line of the vehicle 7.

Returning back to the subroutine of FIG. 5, at step S65, the target swivel angle α2 is calculated by substituting the vehicle speed V indicated by the vehicle speed signal Sv obtained at step S10 and the compensated road curvature Rc determined at step S64 into the equation (3).

Figure 6:
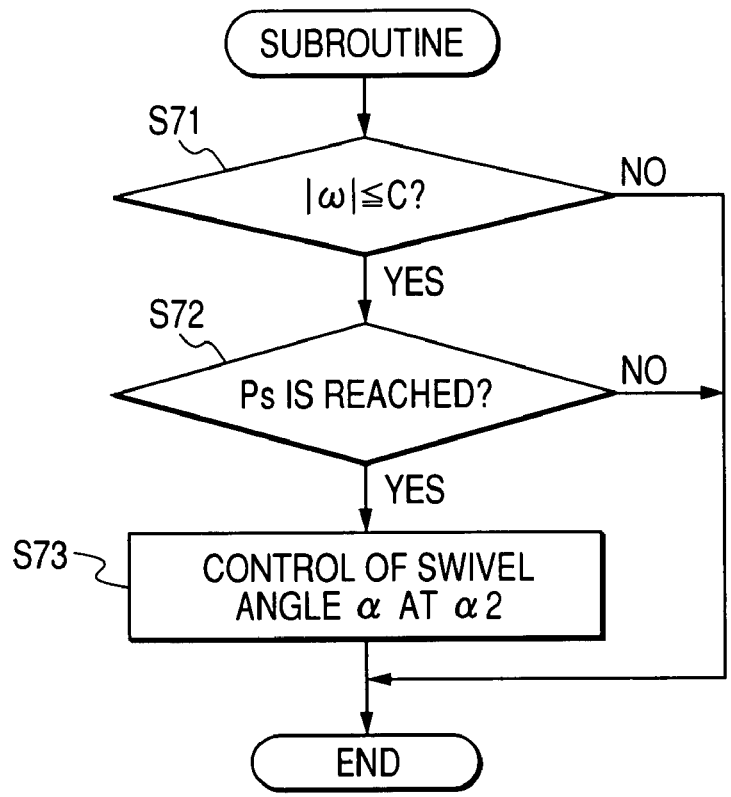
FIG. 6 is a flowchart showing a subroutine included in the main routine, which is executed to perform the advanced swivel control.

Next, explanation is made as to the subroutine shown in FIG. 6, which is executed for performing the advanced swivel control. This subroutine begins by judging, at step S71, whether or not an absolute value of the steering angle ω indicated by the steering angle signal Sω obtained at step S 20 in FIG. 2 is smaller than a predetermined steering angle-dependent swivel control switchover angle C. If the judgment at step S71 is negative, the subroutine is terminated, and the main routine of FIG. 2 proceeds to step S80. If the judgment at step S71 is negative, the subroutine proceeds to step S72.

At step S72, it is judged whether or not the vehicle 7 has reached the control start point Ps determined at step S63 in FIG. 5 on the basis of the on-road current position information obtained at step S30 in FIG. 2. If the judgment at step S72 is negative, or if the control start point Ps has not been set yet, the subroutine is terminated, and the main routine of FIG. 2 proceeds to step S80. If the judgment at step S72 is affirmative, the subroutine proceeds to step S73.

At step S73, the drive mechanism 53 is operated to increase the actual swivel angle alpha in a direction toward the target swivel angle α2 calculated at step S 65 by a predetermined unit angle. This unit angle is set at a value sufficiently smaller than a normal value of the target swivel angle α2.

Figure 7:
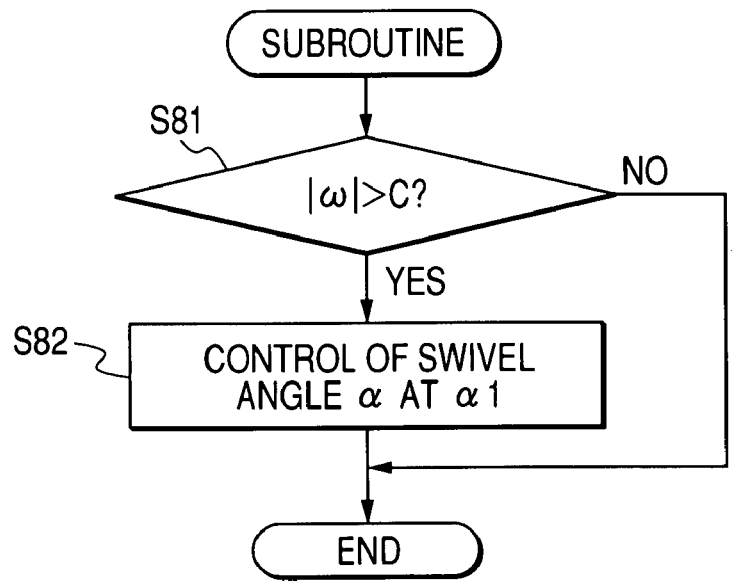
FIG. 7 is a flowchart showing a subroutine included in the main routine, which is executed to perform the steering angle-dependent swivel control.

Next, explanation is made as to the subroutine shown in FIG. 7, which is executed for performing the steering angle-dependent swivel control. This subroutine begins by judging, at step S81, whether or not an absolute value of the steering angle ω indicated by the steering angel signal Sω obtained at step S20 in FIG. 2 is larger than the steering angle-dependent swivel control switchover angle C. If the judgment at step S81 is affirmative, it means that the steering wheel of the vehicle 7 is turned.

If the judgment at step S81 is negative, the subroutine is terminated. If the judgment at step S81 is affirmative, the subroutine proceeds to step S82. At step S82, the drive mechanism is operated to increase the actual swivel angle α in a direction toward the target swivel angle α1 calculated at step S52 in FIG. 4 by a predetermined unit angle.

The above described process is performed repeatedly at predetermined time intervals, as a result of which the advanced swivel control is initiated when the vehicle 7 has reached the control start point Ps located before the curved line end point Pi to cause the swivel angle α to gradually approach to the target swivel angle α2. If it is judged that the steering wheel is turned, switching is made to the steering angle-dependent swivel control even if the advanced swivel control is in operation.

In this embodiment, an image of a view ahead of the vehicle is obtained (step S41), and the width-direction width D is determined from this image (step S42 to Step S44). And the road curvature R obtained from the road map data is compensated by the width-direction width D to determine the compensated road curvature Rc, and the target swivel angle α2 used in the advanced swivel control is calculated on the basis of the compensated road curvature Rc. Accordingly, since the direction of the target swivel angle α2 well coincides with the viewing angle of the driver, the headlight 2 can illuminate the direction to which the driver should pay attention during the advanced swivel control.

Furthermore, this good coincidence between the direction of the target swivel angle α2 and the viewing angle of the driver makes it possible to avoid the driver from feeling strange when the advanced swivel control is switched to the steering angle-dependent swivel control in which the target swivel angle is α1, because the actual swivel angle does not vary largely at the moment of this switching.

It is a matter of course that various modifications can be made to the above described embodiment.

For example, although the number of lanes is determined by analyzing the image of a view ahead of the vehicle in the above described embodiment, it may be determined in such a way that the road map data is added with information indicating the number of lanes, and the number of lanes at a current position of the vehicle detected by the position detection unit 42 is obtained from the road map data.

For another example, although the width-direction distance D indicating a distance between the width-direction center of the driving road and the vehicle is calculated by detecting what number lane from the width-direction center is the lane in which the vehicle is travelling in the above described embodiment, it may be directly calculated by analyzing the image of a view ahead of the vehicle to detect a position of an object defining a road centerline such as a median.

The above explained preferred embodiments are exemplary of the invention of the present application which is described solely by the claims appended below. It should be understood that modifications of the preferred embodiments may be made as would occur to one of skill in the art.

What is claimed is:

1. A headlight swivel control apparatus for laterally controlling a swivel angle of a headlight of a vehicle comprising:

a first function of obtaining road map data, current position information indicating a current position of said vehicle in said road map data, and width-direction-position information for determining a position of said vehicle on a road on which said vehicle is driving in a width direction of said road;

a second function of determining a control start point on said road on the basis of said road map data and said current position information;

a third function of determining, on the basis of said road map data and said current position information, a width-direction distance representing a distance between a centerline of said road and said vehicle;

a fourth function of calculating a first target swivel angle depending on road curvature data included in said road map data, said road curvature data indicating a curvature of said road ahead of said vehicle; and a fifth function configured to start, when said vehicle reaches said control start point, to perform a first swivel control in order to cause said swivel angle of said headlight to approach to said first target swivel angle.

2. The headlight swivel control apparatus according to claim 1, wherein said first function is configured to further obtain a steering angle signal indicative of a steering angle of a steering wheel of said vehicle and a vehicle speed signal indicative of a speed of said vehicle, said headlight swivel control apparatus further comprising a sixth function of detecting whether or not said steering wheel is turned, and a seventh function of performing a second swivel control in order to cause said swivel angle of said headlight to approach to a second target swivel angle determined depending on said steering angle and said vehicle speed.

3. The headlight swivel control apparatus according to claim 2, configured to stop performing said first swivel control and start performing said second swivel control when said steering wheel is detected to be turned.

4. The headlight swivel control apparatus according to claim 1, wherein said fourth function is configured to compensate a road curvature of said road portion ahead of said vehicle indicated by said road map data on the basis of said width-direction distance, and to calculate said first target swivel angle on the basis of said compensated road curvature.

5. The headlight swivel control apparatus according to claim 1, further comprising a sixth function of making a judgment as to whether said road is a multiple-lane road or a single-lane road on the basis of said width-direction-position information, a memory device storing data representing a preset relationship between the number of lanes from a centerline of said road to a lane in which said vehicle is traveling and said width-direction distance, said third function being configured to determine said width-direction distance to be 0 when said sixth function judges said road to be a single-lane road, to determine what number lane from said centerline is a lane in which said vehicle is traveling when said sixth function judges said road to be a multiple-lane road, and to determine said width-direction distance on the basis of the numbers of lanes from said centerline to said vehicle and said data representing said preset relationship.

6. The headlight swivel control apparatus according to claim 5, wherein said first function is configured to obtain, as said width-direction-position information, an image of a view ahead of said vehicle from a camera mounted on said vehicle, and said sixth function is configured to make said judgment by analyzing said image.

7. The headlight swivel control apparatus according to claim 6, wherein said third function is configured to determine what number lane from said centerline is a lane in which said vehicle is traveling by analyzing said image.

* * * * *